INVENTORS
HARRY CHEUNG
KAI WING YOUNG
ATTORNEY

INVENTORS
HARRY CHEUNG
KAI WING YOUNG

INVENTORS
HARRY CHEUNG
KAI WING YOUNG

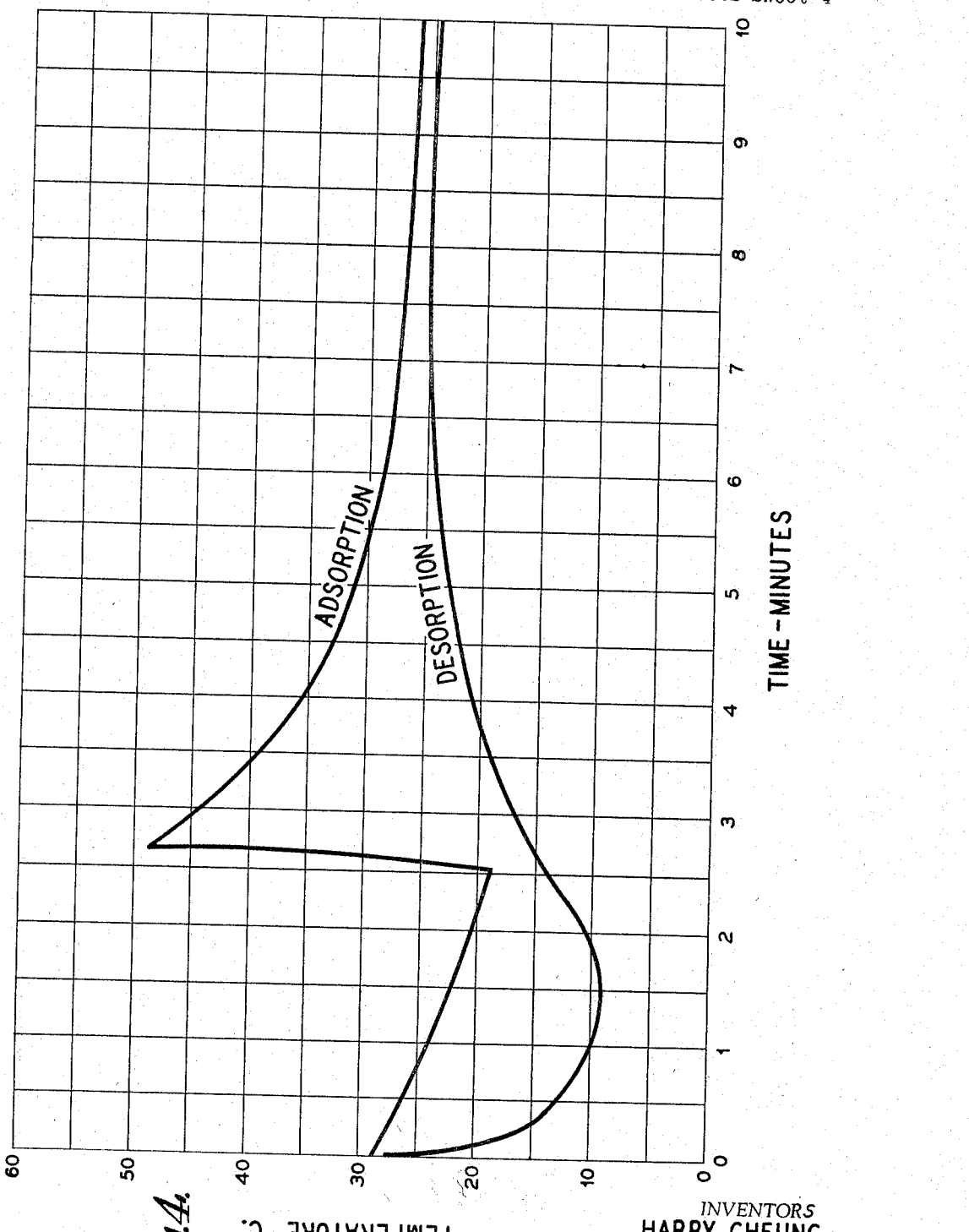

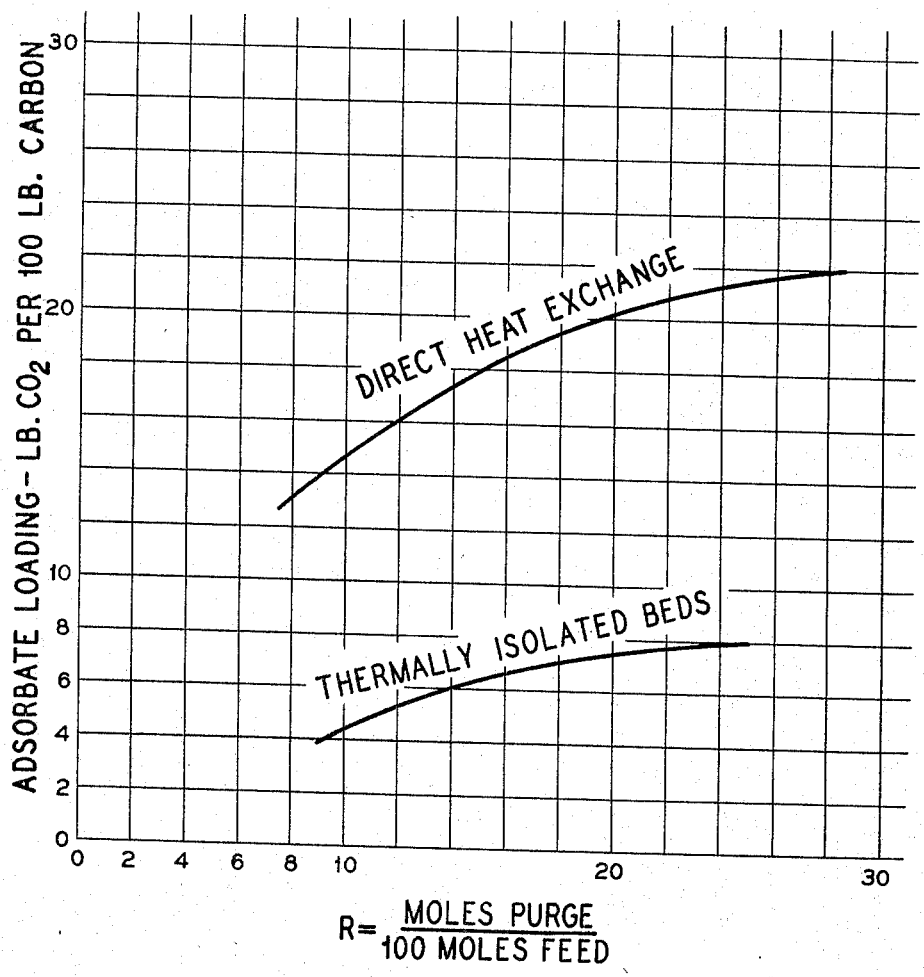

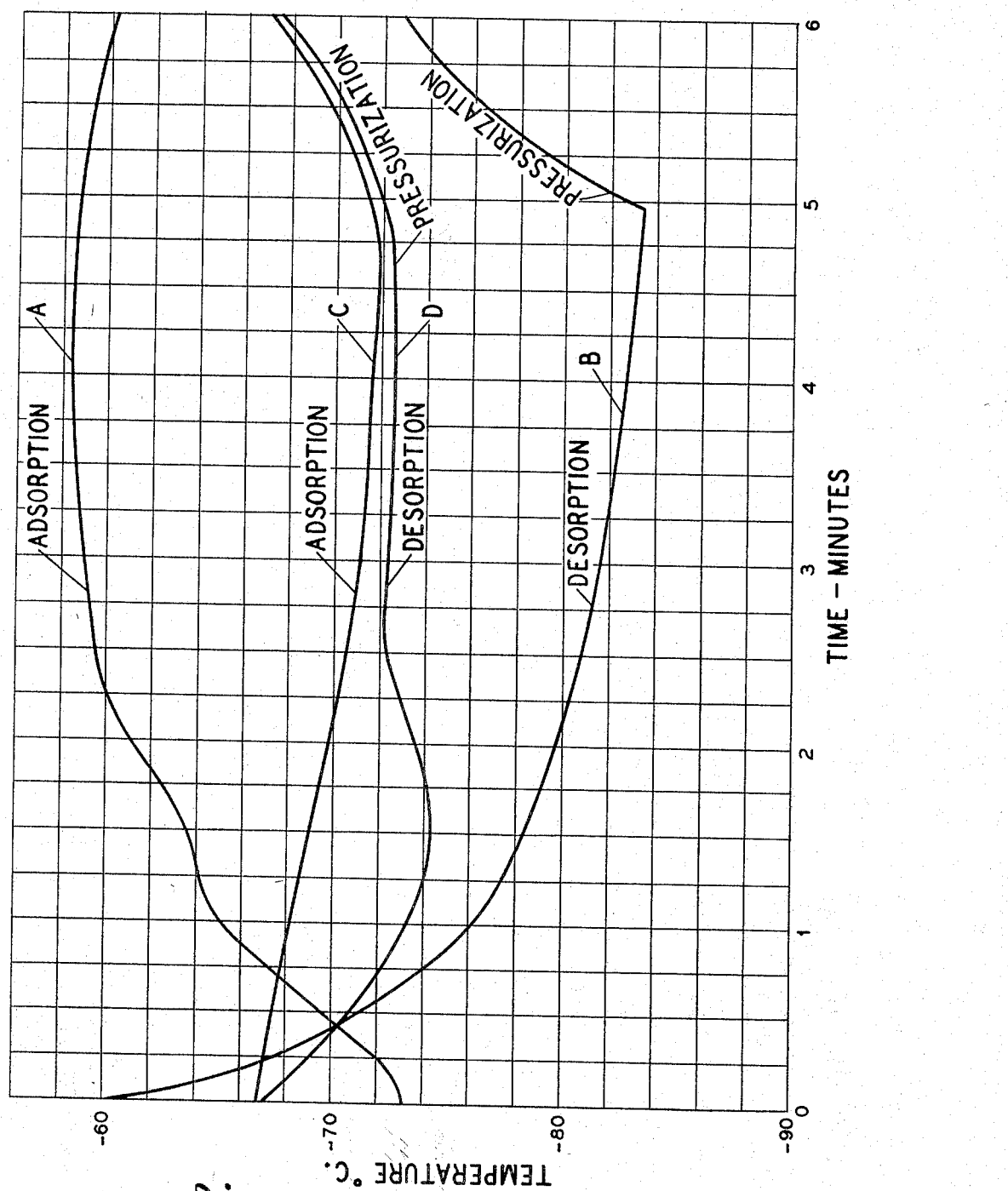

United States Patent Office 3,323,288
Patented June 6, 1967

3,323,288
SELECTIVE ADSORPTION PROCESS AND
APPARATUS
Harry Cheung, Kenmore, and Kai Wing Young, Buffalo, N.Y., assignors to Union Carbide Corporation, a corporation of New York
Filed May 27, 1964, Ser. No. 370,488
19 Claims. (Cl. 55—58)

This invention relates to the separation of fluid mixtures by selective adsorption, and more particularly to fluid mixture separation by swinging the partial pressure of the adsorbate in a cyclic adsorption-desorption system.

Two commonly used methods of changing the capacity or loading of an adsorbent are (1) changing the pressure, and (2) changing the temperature. A third method of changing adsorbent loading is by changing the concentration of the adsorbed component in the gas phase surrounding the adsorbent. Thus an "inert" purge gas can be used alone to remove an adsorbed phase. However a purge is usually used to assist differential loading in either pressure swing or temperature swing cycles. The equilibrium loading on an adsorbent normally increases with higher pressure or with lower temperature, and the differential loading which occurs between two cyclically-imposed sets of conditions is utilized to separate a fluid mixture of a more strongly adsorbed component and a less strongly adsorbed component.

U.S. Patent No. 2,944,627 to Skarstrom typifies a pressure swing adsorption process wherein the driving force for separation is a difference in pressure between the adsorbent loading step and the desorption step. The two steps are conducted sequentially in a short time cycle so that the adsorption front is contained and maintained within the bed.

Adsorption and desorption are accompanied by heat effects similar in nature to heats of condensation and vaporization. Heat is liberated as a fluid is adsorbed (heat of adsorption) and tends to warm the adsorbent bed and, conversely, heat is taken up by the fluid when it desorbs and thus tends to chill the bed (heat of desorption).

FIG. 1 shows the cyclic temperature change which has been observed at the midpoint of a bed operated in a manner similar to that described in the Skarstrom patent. The ordinate of this graph is the midpoint bed temperature and the abscissa is the time elapsed during an 8-minute half cycle. For this illustration the feed gas mixture comprises 80% hydrogen and 20% carbon dioxide at a total pressure of 275 p.s.i.a., and is supplied to a bed of activated carbon at a temperature of 25° C. for a period of 8 minutes. It will be apparent from an inspection of curve A in FIG. 1 that when the longitudinally advancing adsorption front reaches the bed midpoint (after about 3 minutes) the bed temperature rises from about 12° C. to about 55° C. After 8 minutes the bed was desorbed by depressurization to near-atmospheric pressure and by purging. Purge gas was obtained by diverting a portion of hydrogen effluent gas to the effluent end of a second activated carbon bed previously loaded with carbon dioxide. The purge gas flowed through this bed at the reduced pressure in a direction countercurrent to the previously flowing feed gas for a period of 8 minutes. During this period the mid-point temperature is continuously declining, as evidenced by curve B. The vertical separation of curves A and B at any point on the abscissa time scale also indicates the temperature difference between the mid-points of two beds operating alternately on the adsorption and desorption steps at that particular moment. The heat involved in a commercial-sized process can be enormous. For example, in a process producing 1,000,000 cu. ft. pure hydrogen per hour from a feed stream containing 20% carbon dioxide, the total heat evolved from carbon dioxide adsorption is about 8,000,000 B.t.u./hr.

As the selective adsorbent bed warms due to released heat of adsorption, its capacity drops drastically as illustrated in FIG 2 which is a plot of the $CO_2$ loading versus the bed temperature. The upper curve is for 55 p.s.i.a. partial pressure of carbon dioxide and is representative of capacities during the adsorption step. Comparing FIGS. 1 and 2, it can be seen that the sharp temperature rise observed when the adsorption front passes the midpoint is accompanied by over 40% loss in carbon dioxide capacity in this zone of the bed. This loss is not regained as the cycle continues. At the end of an 8 minute adsorption step, the loss in capacity is still over 39%.

As the bed chills due to the heat of desorption, its capacity for holding the adsorbed phase increases. This chilling effect is shown in curve B of FIG. 1 for the midpoint of the bed. A loading curve for 3 p.s.i.a. $CO_2$ partial pressure is shown in FIG. 2 and is representative of the capacities prevailing under the lower pressure desorption step of adsorptive pressure swing cycles. Percentagewise, the gain in adsorptive capacity during desorption is just about as great as the loss of capacity during adsorption. The result of this gain in capacity during the desorption step is to reduce the cleanliness of the bed at the end of the desorption step. Less of the adsorbed phase is removed with a given volume of purge and the bed remains partially loaded with the adsorbate.

The net effect of the heats of adsorption and desorption on the performance of prior art pressure swing adsorption systems is gas mixture separation of limited efficiency and low differential loading. Temperatures favoring low adsorbate loadings occur during adsorption when highest capacity is needed. On the other hand, temperatures favoring high adsorbate loading occur during desorption when reduced capacity is desired. Specific detrimental effects are to require a larger adsorbent bed for performing a given gas mixture separation, and to increase blowdown loss when the pressure is reduced from the feed gas mixture adsorption pressure to the purge gas desorption pressure. More specifically, product recovery is reduced when the product is the less strongly adsorbed component and product purity suffers when the product is the more strongly adsorbed component of the gas mixture.

The above-described adverse heat effects are unavoidable in prior art pressure swing cycles as typified by Skarstrom U.S. Patent 2,944,627. It is an object of such adiabatic-type cycles to contain the heat of adsorption within the adsorbent so that the bed acts as a regenerator, wherein the "packing" stores heat of adsorption until needed in a subsequent stroke for desorption. However, because the heat capacity of adsorbent materials is low, large temperature swings occur in the bed resulting in low differential loadings.

An object of this invention is to provide an improved system for separating gas mixtures involving removal of at least one selectively adsorbable component at a first higher partial pressure of the adsorbate and desorption of such component at a second lower partial pressure of the adsorbate.

Another object is to provide an improved pressure swing, selective adsorption system for separating gas mixtures in which the detrimental effects of the heats of adsorption and desorption are avoided.

A further object is to provide an improved pressure swing, selective adsorption system for separating gas mixtures in which the differential loading of adsorbate between the adsorption and desorption is substantially higher than heretofore attained. A still further object is to provide an improved pressure swing system in which the separation efficiency between the absorbable and non-adsorbable components of the feed gas mixutre is considerably above the heretofore proposed systems.

Other objects and advantages of this invention will be apparent from the ensuing disclosure and the appended claims.

In the succeeding drawings:

FIG. 4 shows the temperature history of the adsorption zone's midpoint when dual zones are directly heat exchanged;

FIG. 5 is a graph showing the effect of direct heat exchange on differential adsorbate loading and the quantity of purge gas required;

Figure 3:
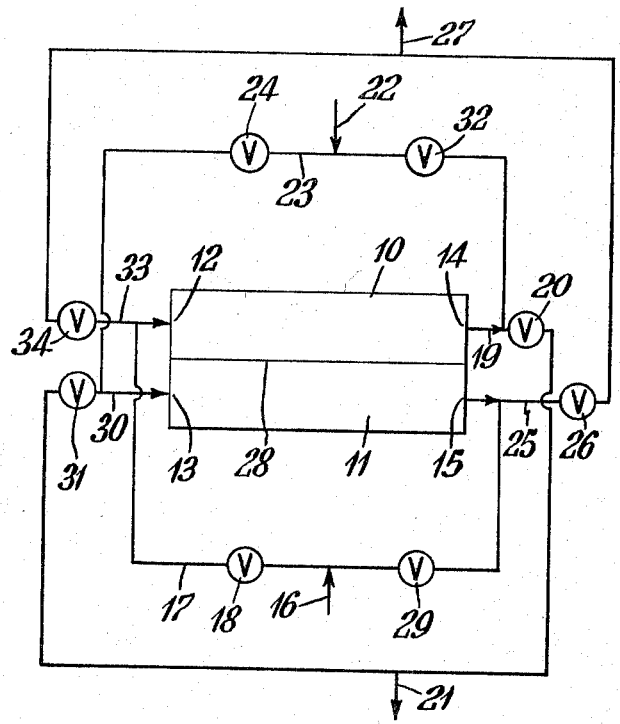
FIG. 3 is a schematic drawing of a dual adsorption zone system for separating gas mixtures according to the invention.
Figure 9:
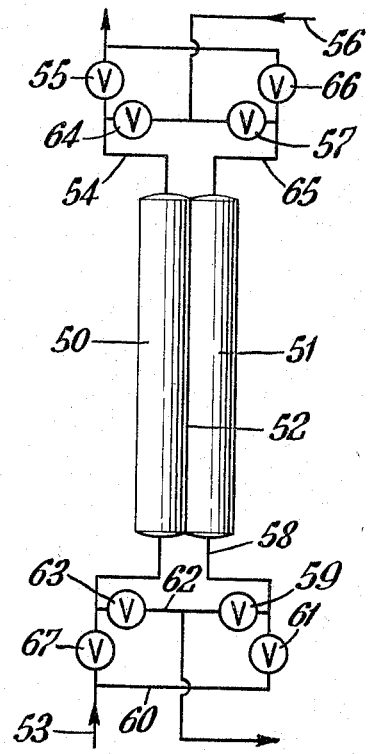

FIG. 8 compares the temperature histories of the adsorption zones' midpoints when abiabatic and direct heat exchange adsorption are employed; and FIG. 9 is a schematic drawing of another dual adsorption system similar to FIG. 3.

In this invention, the detrimental temperature swing inherent in prior art pressure swing systems is avoided by transferring the heat evolved during adsorption directly to another adsorbent bed where it provides a warming effect during desorption. The net effect of this direct heat exchange is to approach isothermal conditions in both beds (equivalent to operating beds with infinite heat capacity) and thus markedly increase differential adsorbate loadings over the conventional pressure swing systems. As used herein, "isothermal" means an approach to thermal uniformity in the associated zones or beds during the adsorption-desorption cycle.

To accomplish the required heat transfer, at least two adsorbent beds are thermally integrated in the form of a packed heat exchanger—one bed occupying one side of the exchanger and another bed occupying the opposite side. By proper arrangement and timing of fluid flows, the heat liberating region developed in one bed during adsorption is thermally matched with the heat absorbing zone developed in the other bed during desorption. Heat is transferred directly from the higher temperature adsorption zone to the lower temperature desorption zone. Extreme temperature changes are largely dampened or cancelled as the heat is transferred immediately to and from the bed rather than being stored within the bed. The fluid mixture is alternately contacted with the first and second selective adsorption zones thereby adsorbing a fraction of the mixture enriched in the one component at a first higher partial pressure and warming the zone by the heat of adsorption. Simultaneously the partial pressure of the adsorbed fraction is reduced in the other directly thermally associated zone for desorption thereof, this desorbed fraction having been previously adsorbed from the fluid mixture in the other zone. The heat of adsorption released in the first zone is transferred to the second zone under the temperature difference resulting from the warming and cooling of the zones. The resulting temperature difference between the two zones is less than would exist absent such transfer of heat.

The invention also contemplates novel apparatus for performing the previously described process. In one embodiment of this apparatus, at least two selective adsorbent beds are provided, each having a first end and second end in the longitudinal direction. Means are also provided for maintaining the beds in direct thermal association in the longitudinal direction. Means are used for introducing the fluid mixture at a first higher partial pressure of the adsorbed fraction to one end of the first bed, and for discharging the adsorbable component-depleted effluent fraction from the opposite end of first bed. Likewise, means are available for supplying and introducing purge gas at a second lower pressure to an end of the second bed for removal of previously adsorbed component, and for discharging the adsorbable component-containing purge gas from the other end of the second bed. Switching means as, for example, control valves are used for diverting the purge gas flow from the second bed to the first bed, and for switching the fluid mixture flow from the first bed to the second bed. Other switching means are provided to redirect the fluid mixture flow back to the first bed and purge gas flow back to the second bed.

As used herein, the phrase "direct heat exchange" refers to a thermal coupling achieved by fixed, solid thermally conductive media joining the adsorption zones so coupled. This media may, for example, be a single common wall serving as a longitudinal boundary for both zones, a metal joint extending end-to-end over the length of separate but contiguous walls, or a series of metal connectors. Direct heat exchange does not include adsorption zones coupled by circulating fluids as the thermal effects of fixed solid conductive media and of circulating fluids are quite different. Direct heat exchange permits immediate transfer of heat from a localized level of one zone to a corresponding level of the other zone. In contrast, indirect heat exchange by, for example, circulating fluids spreads or "smears" the transfer over a region of one zone which may be quite remote from the corresponding region of the other adsorption zone where the heat was generated. With circulating heat exchange fluids, the bulk of the heat will be transferred to the bed at the point of introduction of the fluid, regardless of where the heat may be needed. It will be apparent that the region of the coupled zones where heat exchange is needed will move longitudinally through the zones during the adsorption step, due to the advancing adsorption front. Such flexibility cannot be achieved with circulating fluids without immense mechanical complication.

The invention is illustrated schematically in FIG. 3, in which fixed adsorption zones 10 and 11 are provided in direct thermal association with each other in the longitudinal direction. First end 12 of first zone 10 is thermally associated with first end 13 of second zone 11; second end 14 of first zone 10 is thermally associated with second end 15 of second zone 14. The specific form or construction used for the heat exchanged beds is subject to choice. For example, plate and corrugated fin type exchangers may be used rather than tube and shell construction. With a plate and fin exchanger all the passages are filled with adsorbent of sufficiently fine particle size to flow freely through the fins, and the adsorbent is retained within the passages by means of screens or similar matrix. Keep-full devices may be provided in the headers to replenish any adsorbent which might be lost due to attrition of particles within the passages. The heat exchanger should be designed so that both sets of passages have approximately equal heat transfer area and volume.

The feed gas mixture is supplied to conduit 16 at a first higher pressure and directed through connecting conduit 17 having control valve 18 therein to the first zone first end 12. The feed gas is then passed through first zone 10 in a direction from end-to-end and the selectively adsorbable component is removed therefrom. The first zone 10 is warmed by virtue of the heat of adsorption, and an effluent gas is discharged from the first zone second end 14 into conduit 19 having control valve 20 therein. The effluent non-adsorbed gas is discharged from the system through connecting conduit 21.

Simultaneously with the feed gas mixture flow through first zone 10 in an end-to-end direction, a purge gas is supplied to conduit 22 at a second lower pressure and directed through connecting conduit 23 having control valve 24 therein to second zone first end 13. This purge gas is preferably at substantially the same temperature as the feed gas mixture, and passes through thermally associated second adsorption zone 11 from end-to-end, thereby desorbing the component previously adsorbed from the feed gas. The selectively adsorbed component-containing purge gas is discharged from the second zone second end 15 into conduit 25 having control valve 26 therein, and withdrawn from the system through connecting conduit 27. If the second lower pressure of the purge gas is below atmospheric, a vacuum pump may be provided in conduit 27.

As previously indicated, the heat of adsorption tends to warm first selective adsorption zone 10, and the heat of desorption tends to cool second selective adsorption zone 11. Since these zones are in direct thermal association from end to end, the heat of adsorption is transferred laterally from its point of generation in first zone 10 to a point in second zone 11 which is concurrently being chilled by desorption. The flow of purge gas also promotes efficient heat transfer between the adsorbent particles and the thermally conductive wall 28 separating first and second zones 10 and 11.

When first selective adsorbent zone 10 becomes sufficiently loaded with the adsorbed component, flows are switched so that first zone is placed on purge and second adsorption zone 11 is placed on the adsorption step. These changes may be accomplished by closing valve 18 in conduit 17 and directing the feed gas mixture at the first higher pressure through control valve 29 in conduit 17 to the second end 15 of second zone 11. The one component-depleted effluent gas is discharged through second zone first end 13 to conduit 30 for flow through opened control valve 31 to connecting product conduit 21.

At the same time zone 10 is depressurized by opening valve 34 to release the pressure through conduit 27, and the purge gas is diverted through conduit 23 and opened control valve 32 to connecting conduit 19 and thence into the second end 14 of first adsorption zone 10. The adsorbate is thus desorbed and displaced, and is withdrawn with the purge through the first end 12 for flow through conduit 33 having opened control valve 34 therein. The adsorbate-laden purge gas is then withdrawn from the system through conduit 27.

The previously described flow switching may, for example, be accomplished by a timing mechanism, so that the certain valves are opened and other valves are closed after a predetermined period has elapsed. Alternatively the flow switching may be initiated in response to a temperature sensing device, as for example thermocouples, although effective heat exchange will reduce the sensitivity of the method. Both time and temperature control systems are well-known to those skilled in the adsorption art. In simple pressurization-depressurization cycles without a flow-through adsorption step, the cycle can also be controlled in response to pressures or pressure differences. Another controllable variable is the degree to which the adsorption zone is loaded with adsorbate before desorption is initiated. For example, as described in German Patent No. 871,886, both or either adsorption and desorption may be terminated before the adsorbent is completely saturated or depleted with respect to the adsorbate. Alternatively, adsorption may be continued until the leading edge of the adsorption front has reached the effluent end of the zone, and the concentration of the adsorbate in the effluent gas has begun to increase.

It will be noted that in any one adsorption zone the successive flows of feed gas mixture and purge are opposite, but at any given time the flows of feed and purge in the two adsorption zones are in the same direction or cocurrent. This particular arrangement may be termed "adsorption with cocurrent heat exchange." As will be discussed hereinafter, this invention also contemplates "adsorption with countercurrent heat exchange," or flows of feed and purge in the two adsorption zones in the opposite direction.

The thermal effect of cocurrent heat exchange on the adsorption zones is illustrated in FIG. 4. This figure is analogous to FIG. 1 and shows the temperature history of the bed midpoint during the two half-cycles. Whereas an abrupt temperature rise still occurs when the adsorption front reaches the midpoint, direct heat exchange with the purging bed rapidly recools the bed to restore its adsorptive capacity. A temperature closely approaching that of the entering feed gas mixture is reached before the end of the cycle. On depressurization and purge, the chilling effect of desorption is rapidly offset by heat transferred in from the adsorption zone adjacent the opposite side of the heat transfer wall. The purging bed is soon restored to essentially feed gas temperature at which condition the adsorbed phase is removed more rapidly and completely. Comparing conditions at the critical terminal periods of adsorption and desorption, it is seen that essentially isothermal conditions are attained.

Figure 1:
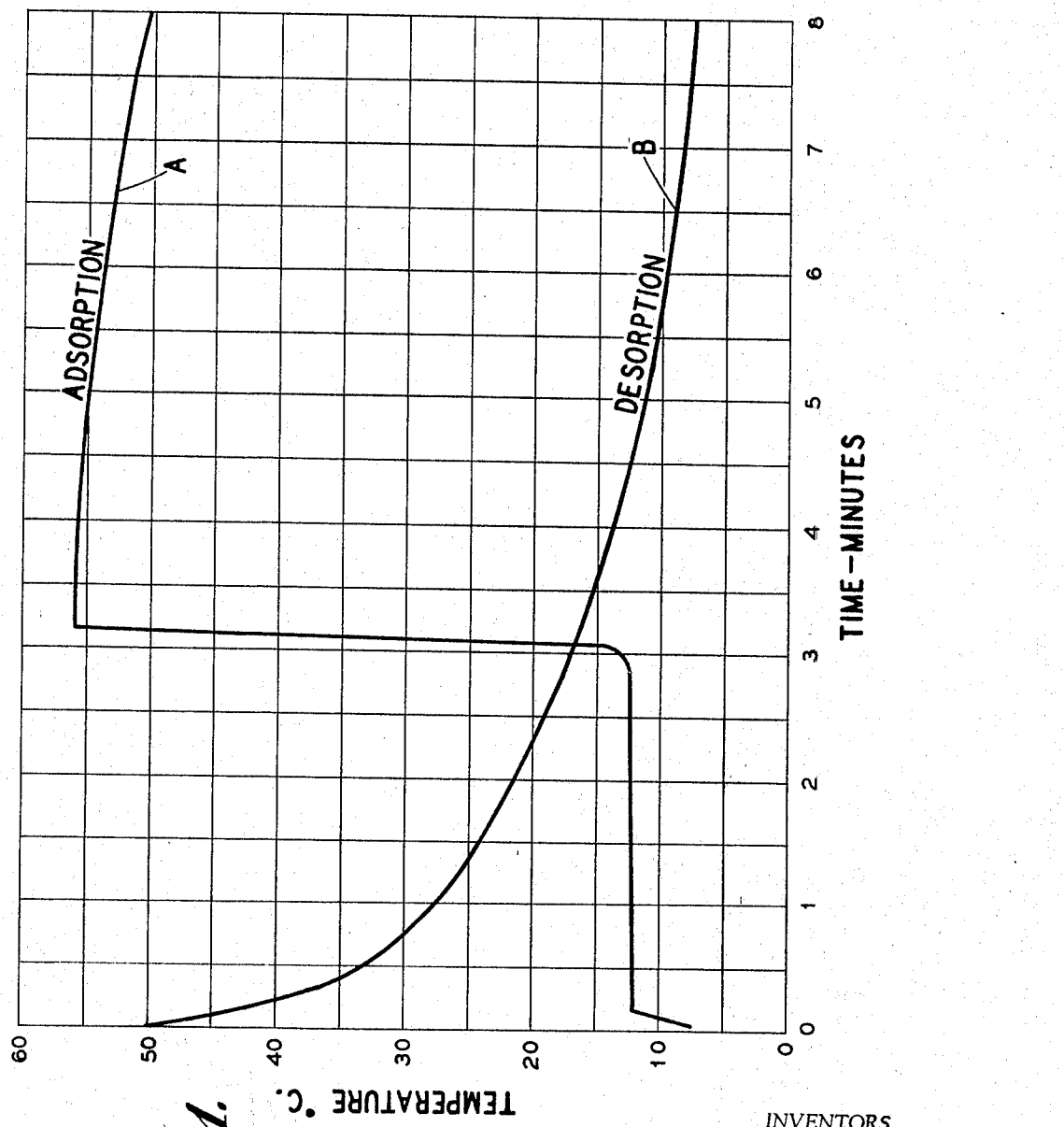
Figure 2:
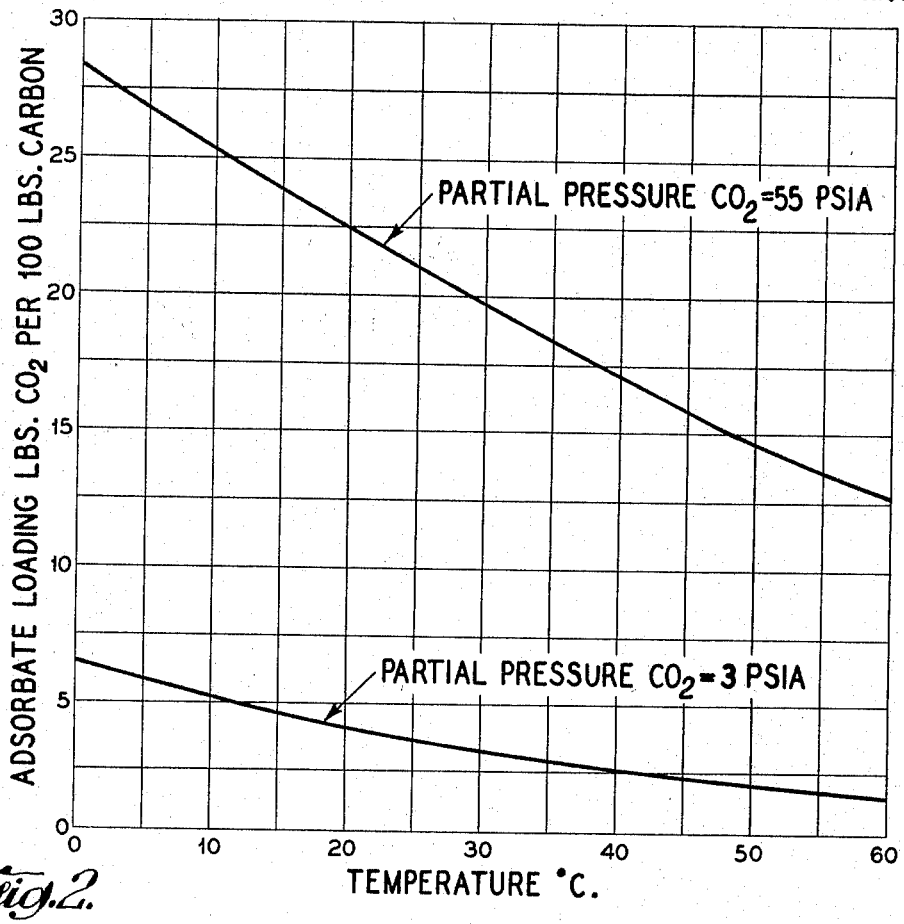

A direct comparison with the prior art temperature profile of FIG. 1 illustrates the great improvement which this invention offers in approaching isothermal conditions. In the thermally isolated dual adsorption zone arrangement of FIG. 1, the temperatures of the midpoints of the beds at the termination of the adsorption and desorption steps are 50° C. and 7.5° C., respectively, giving a temperature difference between the beds of 42.5° C. In contrast, the corresponding temperatures in the thermally associated zones of FIG. 4 are 26.5° C. and 25° C., respectively, or a temperature difference of only 1.5° C. By comparing FIGS. 1 and 2, it is seen that the direct heat exchange has reduced the temperature of the bed on adsorption from 50° to 26.5° C., thereby greatly increasing the maximum equilibrium loading of the bed. Furthermore, direct heat exchange has increased the temperature of the beds being desorbed from 7.5° to 25° C., thereby greatly reducing the equilibrium loading and substantially increasing the cleanliness of the desorbed bed. It should also be recognized that with direct heat exchange, warmer temperatures prevail at the midpoint throughout most of the desorption step. This increases the cleaning ability of a given quantity of purge gas or alternatively permits a given amount of cleaning to be accomplished by a smaller quantity of gas.

The beneficial effect of direct heat exchange on differential loading is illustrated dramatically in FIG. 5 which is a plot of differential loading versus the ratio of moles feedstock to moles purge gas. The lower curve for thermally isolated adsorption zones or beds falls between 4 and 8 lbs. carbon dioxide per 100 lbs. activated carbon. The upper curve for cocurrent heat exchanged beds lies between 14 and 21.5 lbs. carbon dioxide per 100 lbs. activated carbon selective adsorbent. FIG. 5 shows clearly that from 2½ to 3½ times more carbon dioxide can be separated with each pound of activated carbon when direct heat exchange is employed. These higher adsorbate differential loadings permit relatively small traps with low blow-down losses and with high product recovery.

The purge gas is often a fraction of the pure non-adsorbed product gas, and this fraction is wasted by remixing with the adsorbate-containing impurity stream. Accordingly, low values of the purge/feed ratio R (FIG. 5) are desirable to minimize the quantity of clean gas which must be used for purging. Direct heat exchange between the on-stream and purging adsorption zones permits very low purge/feed ratios while still obtaining a differential adsorbate loading well above that obtainable in the prior art.

While FIG. 3 has been described in conjunction with a system in which a non-adsorbed effluent gas is continuously discharged from the zone processing the feed gas, this invention also contemplates a system in which the adsorption step comprises simple pressurization to a first higher partial pressure of the adsorbate, and the desorption step comprises simple depressurization to reduce the adsorbate partial pressure to a second lower level. The flows would be the same as previously described, except that purge gas would not be introduced through conduit 22 and a vacuum pump would preferably be used in conduit 27 to draw off the desorbate from the off-stream zone. Thus the usefulness of the invention is not limited to transferring heat during constant-pressure adsorption and purge strokes; it is also beneficial in modifying the adverse heat effects developed during pressurization and depressurization.

It should also be recognized that the total pressure during the desorption step need not be less than the total pressure of the feed fluid during the adsorption step. For example, the purge gas may be supplied at the same pressure as the feed fluid, but the partial pressure of the adsorbed fraction during the adsorption step must be higher than partial pressure of this fraction during the desorption step.

Figure 6:
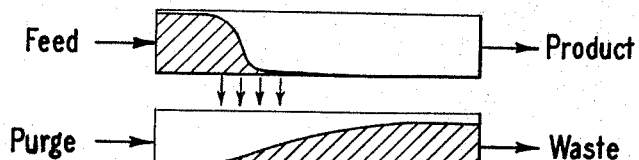
FIG. 6 is a schematic drawing showing the adsorption fronts in dual direct heat exchanged adsorption zones using cocurrent feed-purge gas flow.

In the previously discussed example of the invention, a single strongly adsorbed component (carbon dioxide) is separated from a relatively non-adsorbable "carrier" (hydrogen). In this case, cocurrent heat exchange during adsorption and desorption results in closely matched positions of the heat fronts of the two beds. The reason for this phenomenon is shown schematically in FIG. 6, which depicts two adsorption zones operating with cocurrent heat exchange between feed and purge. At a moment near the beginning of the cycle, the shaded areas represent the loading (concentration gradient) of the adsorbed phase on the bed. Actual adsorbate concentration profiles will vary widely depending upon the operating conditions and the fluids involved. It is seen from FIG. 6 that the heat source, represented by the adsorption front in the upper bed, is approximately abreast of the heat sink, represented by the desorption front in the lower bed. Heat exchange between the two beds (represented by arrows) will effectively reduce the wide temperature fluctuations which accompany these fronts in the prior art thermally isolated adsorption-desorption zones.

If the direction of purge gas flow were reversed in the lower bed (countercurrent heat exchange between feed and purge), the desorption zone at the beginning of the cycle would be located at the opposite end. Thus, the heat sink would be displaced far to the right and out-of registry with the heat source. Stated in another manner, the heat of adsorption from the on-stream bed would be transferred to the purging bed in a region where rapid removal of the most adsorbed phase has not yet occurred and consequently little temperature decline has been experienced. By employing cocurrent heat exchange in systems where only one significant heat front exists, the heat of adsorption is transferred directly to the purged and cooled region of the bed on desorption.

When more than one component is appreciably coadsorbed in a selective adsorption zone thereby creating a plurality of heat fronts, countercurrent flow of feed and purge may provide closer aproach to isothermal conditions. An illustration of a multicomponent coadsorption system is the separation of methane (e.g. 7%) and nitrogen (e.g. 4%) from hydrogen by activated carbon. Methane is the more strongly adsorbed material and consequently produces a more pronounced heat effect. Nitrogen, the less strongly adsorbed impurity, is pushed ahead of the methane so that each impurity forms its own separate adsorption front.

Figure 7A:
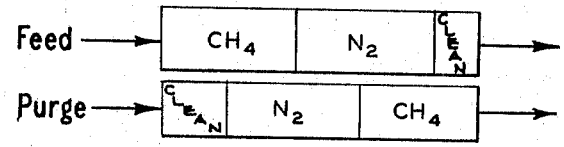
FIGS. 7a and 7b are schematic drawings showing the relative positions for the adsorption fronts in a multi-component coadsorption system using cocurrent and countercurrent feed-purge gas flow, respectively.
Figure 7B:
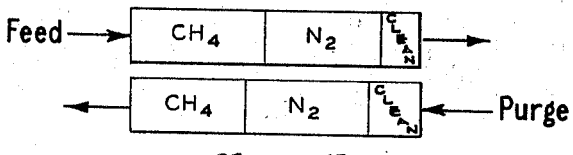

FIGS. 7a and 7b represent the relative position of the two adsorption fronts after the upper, on-stream bed has been partially loaded—i.e. with a clean section of the bed at the effluent end which does not contain appreciable quantities of the adsorbate. In FIG. 7a, cocurrently flowing feed gas and purge gas are shown and the methane-adsorption front of one bed is adjacent to the nitrogen-containing section of the other bed. While noticeable benefit will thus be obtained by direct heat exchanging these beds, it is not the ideal arrangement because the greater heat effect in the methane adsorption section is adjacent to the lesser heat effect in the nitrogen desorption section. In this instance, it is preferable to employ countercurrently flowing feed and purge as shown in FIG. 7b. This arrangement permits direct transfer of the more pronounced heat of adsorption of methane from the on-stream bed to the more pronounced chilling effect of methane desorption in the purging bed.

Any selective adsorbent material may be used in the practice of this invention, as for example activated carbon, charcoal, silica gel, and crystalline zeolitic molecular sieves. The latter are three-dimensional aluminosilicates characterized by interlocking silica and alumina tetrahedra and an extremely large internal adsorption region within the inner cage-work of the molecular sieve molecule. Uniformly sized small pores provide communication between the surrounding atmosphere and the inner adsorption region and the various molecular sieves have different pore sizes. For example, zeolite A has an apparent pore size of 4–5 angstrom units depending on the identity of the structural cation, while zeolite X has an apparent pore size of 9–10 angstroms units. These are the most commonly used synthetic molecular sieve materials and are respectively described in U.S. Patents Nos. 2,882,243 and 2,882,244 to R. M. Milton. Zeolitic molecular sieves also occur in nature, as for example chabazite, erionite and mordenite.

The invention will be more clearly understood by reference to a series of tests, described hereinafter. In the first tests two adsorption zones were contained in copper tubes each 10 feet long, laid side-by-side and silver soldered together for their full longitudinal length. These tubes were packed with 6 to 8 mesh activated carbon to a bulk density of 30 lbs./cu. ft. and were insulated against external heat transfer. The arrangement was used with 5/8-inch O.D., 18 Brown Wire Gauge wall tubes, and also with 1-inch I.D x 1/16-inch thick tubes. Tests with different sized tubes were conducted to determine whether either the tube wall or bed depth (normal to the wall) had any significant effect on results. No significant effect was noted in the span of sizes tested.

A first group of tests was conducted at about ambient temperature of a 20 mol-percent carbon dioxide feed at about 275 p.s.i.a. (55 p.s.i.a. partial pressure carbon dioxide), typical of the separations encountered in industry. Both hydrogen and helium were used as the major, non-adsorbed component in the feed with about equal results. In all runs, the product effluent was obtained with less than 0.1 mol-percent carbon dioxide. The results of these tests are shown in Table I.

TABLE I

| Run | Arrangement | Feed | Purge | Feed Rate, Moles, sq. ft., hr. | Purge Rate, Moles, sq. ft., hr. | Differential Loading, lb. $CO_2$/100 lb. C | Product Contamination with Purge, Percent | Purge Ratio Moles Purge/ 100 Moles Feed |
|---|---|---|---|---|---|---|---|---|
| 1 | Thermally Isolated Traps | 18% $CO_2$ in He | $N_2$ | 18.5 | 1.85 | 4.6 | 2.9 | 10.0 |
| 2 | do | 21% $CO_2$ in He | $N_2$ | 19.2 | 3.5 | 5.75 | 3 | 18.4 |
| 3 | do | do | $N_2$ | 19.2 | 4.5 | 8.0 | 2.8 | 23.2 |
| 4 | Cocurrent heat exchange | 20% $CO_2$ in He | $N_2$ | 42.8 | 7.6 | 19.8 | 1.1 | 17.9 |
| 5 | do | do | $N_2$ | 41.1 | 3.8 | 14.2 | 1.2 | 9.3 |
| 6 | do | do | $N_2$ | 31.0 | 5.25 | 18.8 | 1 | 17.0 |
| 7 | do | do | He | 29.0 | 3.24 | 15.6 | * | 11.2 |
| 8 | do | 20% $CO_2$ in $H_2$ | $N_2$ | 31.3 | 3.27 | 15.7 | 1.1 | 10.4 |
| 9 | do | do | $H_2$ | 34.7 | 2.70 | 12.8 | * | 7.8 |
| 10 | Countercurrent heat exchange | 20% $CO_2$ in He | $N_2$ | 28.2 | 5.25 | 14.5 | 1.5 | 18.6 |

* No contamination—product used for purge.

The striking advantage of direct heat exchange between the on-stream adsorption zone and the purging adsorption zone is shown by comparing runs 1, 2, and 3 without heat exchange with runs 4, 5, and 6 using heat exchange. For example, runs 2 and 4 are directly comparable in that the purge ratios are essentially equal (about 18 moles purge/100 moles feed). Differential loadings are 19.8 and 5.75 lbs. $CO_2$/100 lbs. carbon, with and without direct heat exchange, respectively, showing a 3.4-fold advantage for this invention. Furthermore, it should be noted that with direct heat exchange, the non-adsorbed product is far less contaminated with the purge. This is because more product is produced during each cycle, and the amount of residual purge mixed with product at a cycle change is the same regardless of the amount of product made during the cycle.

Similarly, runs 1 and 5 have comparable purge ratios and show a 3.1-fold advantage for direct heat exchange. Again the purity of the product is improved with respect to residual purge gas. Of even greater significance is the fact that the direct heat exchange feature achieves the combination of low purge ratios (e.g. 9.3) with very high differential loadings (e.g. 14.2). This results in high product effluent recovery with small adsorbent beds.

Other runs in Table I show further embodiments of the invention. While runs 1–6 removed $CO_2$ from helium with nitrogen as the purge gas, run 7 uses a portion of the helium product effluent for purge. Runs 8 and 9 remove $CO_2$ from hydrogen with either nitrogen or product hydrogen as the purge gas. The results show undiminished advantage for heat exchanged beds.

Run 10 is a test employing countercurrent heat exchange. Recalling the previous discussion, one would not expect as good performance as obtained in runs 4–9 with cocurrent heat exchange, owing to the less favorable matching of adsorption and desorption zones in the adjacent zones. Comparing run 10 with runs 4 and 6 (approximately equal purge ratios), it will be seen that somewhat lower loading is obtained with countercurrent heat exchange. However, the adsorbate loading is still far superior to that achieved with thermally isolated adsorption zones, e.g. run 2 or 3.

In another series of tests the gas mixture feed stream contained three impurities to be coadsorbed from hydrogen on activated carbon selective adsorbent. The impurity content of the feed varied somewhat, but in general was about 2 mol-percent $N_2$, 2 mol-percent CO, and 6–8 mol-percent $CH_4$. Three different pressure swing adsorption processes were tested for comparison: adiabatic, isothermal and direct heat exchange. The feed gas was 300–350 p.s.i.g., between −48° and −78° C., and the product effluent was obtained with 400 p.p.m. nitrogen or less. All purge pressures were 1 atmosphere absolute, except for runs 4 and 13 as indicated. Since the nitrogen adsorption front was the first to break through, only this impurity need be monitored to properly control the operation of the process. The results of tests are shown in Table II.

Due to the lower partial pressure of the adsorbable impurity, the differential loadings in the Table II tests are inherently lower than those reported in Table I. Whereas the maximum (equilibrium) loading in the Table I tests was about 20 lbs. $CO_2$/100 lbs. carbon, the maximum obtainable loading in the Table II tests is on the order of 4 lbs. impurities/100 lbs. carbon. The excellence of the differential loadings must be judged in the light of these maximum values.

The isothermal tests of Table II were conducted with thermally isolated adsorption zones immersed in liquid refrigerant and with sufficient radial heat transfer to the liquid to ensure less than 2° C. temperature deviation at any point in the bed during the cycle. Logically, temperature conditions in isothermal adsorption zones should represent the best conditions that can be obtained with direct heat exchanged zones—i.e., the results obtained with true isothermal zones should provide a standard of excellence which direct heat exchanged zones should try to approach.

Contrary to these expectations, the test results in Table II show that differential adsorbate loadings with countercurrent heat exchange may actually exceed those with isothermal adsorption zones by a wide margin. The phenomenon is completely unexpected and believed due to a sharpening or shortening of the mass transfer fronts which occurs with direct heat exchange, thus permitting more complete utilization of the total adsorbent bed. When the mass transfer front is shortened, a smaller portion of the bed is in the leading or "toe" portion of the front where the adsorbent is only partially loaded. Thus, at the end of the adsorption stroke, more of the bed will have become fully loaded.

With further reference to Table II, a comparison of runs 6, 7 and 8 shows that countercurrent heat exchange is more advantageously than cocurrent. This is to be expected when multiple impurities are coadsorbed, as discussed in connection with FIGS. 7a and 7b.

FIG. 8 shows the bed midpoint temperature history of two runs from Table II. Curves A and B describe adsorption and desorption-pressurization, respectively, for run 2 (adiabatic adsorption), and curves C and D describe adsorption and desorption-pressurization, respectively, for run 10 (adsorption with countercurrent heat exchange). It is apparent from a comparison of these histories that direct heat exchange between the beds permits substantially isothermal operation, and provides important advantages in terms of adsorbate loading and reduced quantity of purge gas.

A larger scale test series was conducted in an activated carbon adsorbent-packed heat exchanger consisting of seven 1-inch outside diameter x 0.035-inch wall stainless steel tubes each 11 feet long. These tubes were clustered compactly with six tubes in a 2½-inch diameter circle about a center tube. The tubes were welded into headers and fitted with a 3¾-inch diameter shell. Ac-

TABLE II

| Run | Process | Feed Impurities, percent | | | Differential Loading lb. impurities/100 lb. carbon | Purge Ratio Moles purge/100 Moles Feed | Percent $H_2$ Recovery | Feed Temp., °C. | Purge Press Atm. Abs. | Remarks |
|---|---|---|---|---|---|---|---|---|---|---|
| | | $N_2$ | CO | $CH_4$ | | | | | | |
| 1 | Adiabatic Adsorption | 2.0 | 2.0 | 7.0 | 1.3 | 10.0 | 52.8 | −50 | 1 | Effluent Product Repressurization. |
| 2 | do | 2.0 | 2.0 | 7.0 | 1.8 | 12.5 | 46.4 | −65 | 1 | Do. |
| 3 | do | 2.0 | 2.0 | 7.0 | 0.8 | 10.5 | ~5.0 | −60 | 1 | Do. |
| 4 | do | 2.0 | 2.0 | 7.0 | 1.2 | 3.7 | 31.2 | −78 | ¼ | Do. |
| 5 | Isothermal Adsorption | 2.3 | 1.5 | 7.3 | 2.0 | 7.2 | | −65 | 1 | Feed Repressurization. |
| 6 | do | 2.0 | 2.7 | 6.2 | 2.9 | 10.7 | | −65 | 1 | Do. |
| 7 | do | 1.6 | 2.4 | 6.8 | 2.7 | 9.7 | | −65 | 1 | Product Repressurization. |
| 8 | do | 1.6 | 2.4 | 6.8 | 3.3 | 12.0 | | −65 | 1 | Do. |
| 9 | Countercurrent Heat Exchange. | 2.4 | 2.3 | 7.5 | 3.9 | 12.1 | 63.5 | −48 | 1 | Do. |
| 10 | do | 1.8 | 2.4 | 7.7 | 4.0 | 12.1 | 63.4 | −71 | 1 | Do. |
| 11 | do | 2.0 | 2.0 | 7.0 | 2.8 | 5.0 | 63.2 | −60 | 1 | Do. |
| 12 | do | 2.1 | 2.6 | 7.8 | 3.2 | 10.9 | 71.9 | −72 | 1 | Do. |
| 13 | do | 1.6 | 2.3 | 7.9 | 3.9 | 4.0 | 74.2 | −78 | ¼ | Do. |
| 14 | Cocurrent Heat Exchange. | 2.2 | 1.9 | 7.1 | 2.2 | 10.6 | | −65 | 1 | Feed Repressurization. | tivated carbon (6 to 8 mesh) was packed both inside and outside the tubes.

For the tests using these large-scale adsorption zones, methane, nitrogen and, on certain runs, carbon dioxide were coadsorbed from hydrogen on activated carbon at 350 p.s.i.g. and a feed temperature of −60° C., the results being shown in Table III.

TABLE III

| Run | $CH_4$ | $N_2$ | $CO_2$ | Differential Loading at Breakthrough, lb. impurities/100 lb. carbon | Purge Ratio, Mols Purge/100 Mols Feed |
|---|---|---|---|---|---|
| 1 | 7.0 | 4.3 | 0.0 | 3.9 | 12.5 |
| 2 | 7.1 | 4.4 | 0.0 | 3.6 | 10.5 |
| 3 | 7.2 | 4.4 | 0.0 | 3.1 | 8.4 |
| 4 | 7.1 | 4.4 | 0.0 | 2.8 | 6.3 |
| 5 | 7.1 | 3.1 | 0.20 | 3.2 | 10.5 |
| 6 | 7.0 | 4.3 | 0.20 | 2.8 | 9.0 |
| 7 | 7.0 | 3.0 | 0.02 | 2.4 | 6.8 |

In the previously described small-scale tests, the cycle consisted essentially of two steps: adsorption and purge. The steps of repressurization and depressurization were extremely rapid and did not consume a significant portion of the cycle period. In the large-scale tests, however, pressurization and blowdown required appreciable fractions of the cycle period. Five distinct steps were employed:

(1) Adsorption at feed pressure (350 p.s.i.g.).

(2) Depressurization in the same direction as the adsorption step (cocurrent) to an intermediate pressure. In this step the initial blowdown gas is discharged at the product effluent end of the adsorption zone.

(3) Further depressurization to the purge pressure (about atmospheric) in the opposite direction as the adsorption step (countercurrent). The desorbed impurities are withdrawn from the feed end of the zone.

(4) Purge. Unadsorbable gas at essentially 1 atm. abs. is passed through the zone in a direction countercurrent to the feed gas adsorption step.

(5) Repressurization of the purged adsorption zone to the feed pressure with either the produce effluent or the feed gas mixture.

This series of tests was intended to demonstrate the advantage of the process and equipment under conditions simulating commercial-scale operation. Referring to Table III, it is seen that the same high adsorbate loadings and purge ratio were obtained as in the small-scale tests of Table II.

The significance of this invention is also demonstrated by the following example: Assume that 1,000,000 c.f.h. hydrogen gas containing less than 400 p.p.m. impurity is to be produced from a feed stream containing about 1.8% nitrogen, 2.1% carbon monoxide and 7.4% methane. The feed stream is at 350 p.s.i.g. and −78° C. and the adsorbent is activated charcoal. Two adsorption beds are operated on a 6-minute complete cycle using 3.8 moles purge/100 moles feed at ¼ atm. abs. pressure. Under these conditions thermally isolated beds must contain 175,000 lbs. adsorbent having a volume of 5830 cu. ft., and will process about 3,620,000 c.f.h. feed for the required product gas. By comparison, countercurrently heat exchange beds of this invention need contain only 22,500 lb. adsorbent (750 cu. ft.) and will process only 1,510,000 c.f.h. feed.

Direct heat exchange may also be used advantageously in other selective adsorption systems as, for example, air separation by contact with the previously described calcium zeolite A or sodium zeolite X. These materials selectively adsorb nitrogen, resulting in the discharge of an enriched oxygen product from the effluent end of the bed. In adiabatic traps the temperature difference between adsoprtion and desorption may reach about 15° C. and is indicative of the $\Delta_t$ which would be available for hea exchange if the zones were thermally connected for direct heat exchange. By comparison, it will be recalled that in an adiabatic $H_2$-$CO_2$ separation process the temperature difference at cycle termination may be as high as 42.5° C. Thus, the heat effects in air separation are not as pronounced as in bulk $CO_2$ separation, and the benefits of direct heat exchange are not as great. Furthermore, since the $\Delta_t$ driving force is substantially less in air separation, the heat exchange means directly connecting the adsorption zones must be more effective, e.g., it must provide greater heat transfer area, or less heat flow resistance. Nevertheless, direct heat exchange in air separation can reduce the required adsorption bed volume by 25–35% and can reduce power consumption by 10–20%.

A simple air separation system according to the invention would appear similar to FIG. 3. For example, if a 4-step cycle is employed and countercurrent rather than cocurrent direct heat exchange used, the beds could be matched in their respective adsorption and purge periods, and then in their respective repressurization and depressurization periods. This timing would be as follows for adsorption zones A and B:

| Steps | Cycle | | | |
|---|---|---|---|---|
| | Period 1 | Period 2 | Period 3 | Period 4 |
| 1. Adsorption at feed pressure | A | -------- | B | -------- |
| 2. Countercurrent depressurization to low pressure | -------- | A | -------- | B |
| 3. Purge at low pressure using $O_2$-enriched effluent | B | -------- | A | -------- |
| 4. Feed repressurization to feed pressure | -------- | B | -------- | A |

A disadvantage of the two-zone arrangement is that the product effluent flow (Step 1) is interrupted during Periods 2 and 4 of this cycle. For continuous production of effluent, two sets of direct heat exchanged beds may be used, A and B being thermally joined and beds C and D being thermally joined. Again the cycle may be arranged such that the beds in each thermally coupled pair are matched from the standpoint of time in their respective adsorption and purge periods and in their respective pressurization and depressurization periods. The timing would appear as follows:

| Steps | Cycle | | | |
|---|---|---|---|---|
| | Period 1 | Period 2 | Period 3 | Period 4 |
| 1. Adsorption at feed pressure | A | D | B | C |
| 2. Countercurrent depressurization to low pressure | C | A | D | B |
| 3. Purge at low pressure using $O_2$-enriched effluent | B | C | A | D |
| 4. Feed repressurization to feed pressure | D | B | C | A |

Direct heat exchange between adsorption beds may be advantageously used to preclean compressed air at ambient temperature prior to low temperature separation. The moisture and about 300 p.p.m. $CO_2$ must be removed from air before the cold feed reaches sensitive low temperature equipment such as distillation columns. The conventional method of precleaning air is by flow through complex and thermodynamically inefficient reversing heat exchangers where impurities are frozen out. Chemical cleanup methods have been proposed but are expensive and usually result in saturating the air with moisture. They also require periodic servicing to replace or replenish the chemicals used to remove the impurities.

A series of tests were conducted which illustrate the advantage of employing substantially isothermal operation instead of the adiabatic type. Nitrogen containing about 300 p.p.m. $CO_2$ was used as feed to simulate air. The difference in results between using nitrogen as opposed to air is small and insignificant since the heats of adsorption are about equal for nitrogen and oxygen.

Furthermore, the effect of omitting moisture as an impurity is minor because the heat effects of adsorbing the impurities are small compared to the heat effects of adsorbing nitrogen (or air) during depressurization and repressurization. The benefit resulting from eliminating the temperature swing in the beds is strongly exhibited in the reduced quantity of purge required to remove the adsorbed $CO_2$. The results of these tests are reported in Table IV.

TABLE IV.—$CO_2$ REMOVAL FROM NITROGEN

| Process | T, °C. Adsorption | T, °C. Purge | $P_{p.s.i.a.}$ Adsorption | $P_{p.s.i.a.}$ Purge | Purge Required for $CO_2$ Removal at $T_{purge}$, percent of Feed |
|---|---|---|---|---|---|
| Calcium Zeolite A: | | | | | |
| Isothermal | 22 | 22 | 200 | 15 | 23 |
| Adiabatic | 23 | 3.5 | 197 | 15 | 84 |
| Isothermal | 21 | 21 | 77 | 15 | 37 |
| Adiabatic | 22 | 12 | 77 | 15 | 69 |
| Sodium Zeolite X: | | | | | |
| Isothermal | 22 | 22 | 93 | 15 | 20 |
| Adiabatic | 21 | 10 | 93 | 15 | 65 |
| Isothermal | 22 | 22 | 54 | 15 | 36 |
| Adiabatic | 24 | 18 | 54 | 15 | 61 |

Considering the 200 p.s.i.a. data, isothermal operation requires only 23 moles purge per 100 mole feed for $CO_2$ removal, while adiabatic operation requires 84 moles purge. Since the purge is normally a portion of the product effluent, this means that only 16% of the product effluent can be delivered $CO_2$-free with an adiabatic process.

FIG. 9 illustrates a dual adsorption bed system which can be integrated with an air compressor for a low temperature air separation plant. Adsorption dones 50 and 51 provided in direct end-to-end heat exchange relation by common wall 52. Air at compressor discharge pressure e.g., about 75 p.s.i.g. and ambient temperature is introduced through conduit 53 having control valve 67 therein to the first end of zone 50 filled with an adsorbent such as calcium zeolite A or sodium zeolite X. The $CO_2$ and moisture impurities are selectively adsorbed and the cleaned air effluent is discharged from the second end through conduit 54 having control valve 55 therein.

Simultaneously adsorption zone 51 is being purged by the flow of clean, warmed low pressure gas from the heat exchangers of the air separation plant. This gas, e.g. nitrogen, is introduced through conduit 56 having control valve 57 therein to the effluent or second end of zone 51. The purge gas desorbs the previously adsorbed moisture and $CO_2$ from zone 51 and flows countercurrently to the air passing through zone 50. The heat of adsorption received by the adsorbent in zone 50 is transferred laterally through common wall 52 to the adsorbent in zone 51, thereby tending to offset the cooling effect of the desorbing impurities. This direct heat exchange substantially reduces the temperature difference between zones 50 and 51, thereby approaching isothermal operation as previously described.

The desorbate-containing purge gas is discharged through the first end of zone 51 into conduit 58 having control valve 59 therein, and thereafter vented to the atmosphere. Before $CO_2$ breakthrough in zone 50, zone 51 is repressurized by diverting a portion of the raw air from conduit 53 through conduit 60 with control valve 61 to conduit 58. Repressurization is through the first end of zone 51, and therefore cocurrent to the feed gas flow. The air feed is then switched completely to second zone 51 and zone 50 is depressurized countercurrently through conduit 53 and connecting conduit 62 therein. Next, first adsorption zone 50 is countercurrently purged by the introduction of clean, warm low pressure gas through conduit 56 and control valve 64 to connecting conduit 54 and the second end of this zone. The impurity-free air is discharged from the second end of said second adsorption zone 51 into conduit 65 and thereafter directed through control valve 66 to connecting conduit 54 for passage to the second stage of compression.

The air impurity adsorption zones 50 and 51 may, if desired, be positioned between air compression stages in order that the air processed in the zones will be relatively low pressure. In some cases this reduces the power cost of depressurization. FIG. 9 has been arranged for representation of the purged adsorption zones 50 and 51 with raw air, but this may also be accomplished with cleaned air by suitable valve manipulation at the cleaned air discharge or second end of the zones.

Although preferred embodiments of the process and apparatus of this invention have been described in detail, it will be appreciated that modifications may be made and that some features may be employed without others, all within the scope of the invention.

For example, this invention has been specifically described in terms of separating gas mixtures but it is equally applicable to the separation of liquid mixtures. It may be used advantageously to dry hydrocarbon liquids such as isobutane and isobutene used as feed streams of acid alkylation plants, or octanes used as gasoline.

What is claimed is:

1. A process for separating a fluid mixture containing at least one selectively adsorbable component comprising the steps of providing at least two fixed selective adsorption zones of equal heat transfer capacity in direct end-to-end thermal association with each other coextensively in the longitudinal direction; contacting said fluid mixture with the first selective adsorption zone thereby adsorbing a fraction of said fluid mixture enriched in said one component at a first high partial pressure of such component and warming the first zone by the heat of adsorption; simultaneously reducing the partial pressure of said adsorbable component in the thermally associated second adsorption zone for desorption thereof so as to cool the second zone by the heat of desorption, the adsorbed fraction having been previously adsorbed from said fluid mixture in the second zone; and transferring the heat of adsorption released in said first zone directly to said second zone under the temperature difference resulting from the warming and cooling of the zones whereby the resulting temperature difference is less than would exist absent such transfer of heat.

2. A process according to claim 1 in which said fluid mixture passes through the first zone during the adsorption step and a non-adsorbed portion is continuously discharged therefrom, and purge gas passes through the second zone during the desorption step.

3. A process for separating a gas mixture containing at least one selectively adsorbable component comprising the steps of providing at least two fixed selective adsorption zones of equal heat transfer capacity in direct end-to-end thermal association with each other coextensively in the longitudinal direction; passing said gas mixture through the first selective adsorption zone at a first high partial pressure of the one component thereby adsorbing said one component and warming the zone by the heat of adsorption; simultaneously passing a purge gas through the thermally associated second adsorption zone under a second lower partial pressure of said one component thereby desorbing same and cooling the zone by desorption; and directly transferring the heat of adsorption released in said first zone to the cooled second zone under the temperature difference resulting from the warming and cooling of the zones whereby the resulting temperature difference is less than would exist absent such transfer of heat.

4. A process for separating a gas mixture containing at least one selectively adsorbable component comprising the steps of providing at least two fixed adsorption zones in direct end-to-end thermal association with each other coextensively in the longitudinal direction, a first zone first end being thermally associated with a second zone first end and a first zone second end being thermally associated with a second zone second end; providing said gas mixture at said first zone first end and passing such gas mixture through the first selective adsorption zone in a direction from end-to-end at a first high partial pressure of the one component thereby adsorbing said one component, establishing only one heat front and warming the zone by the heat of adsorption; discharging one component-depleted effluent gas from the first zone second end; simultaneously providing a purge gas at said second zone first end and passing such purge gas through the thermally associated second adsorption zone under a second lower partial pressure of said one component from end-to-end thereby desorbing previously adsorbed one component and cooling the second zone by desorption; directly transferring the heat of adsorption released in the warmed first zone to the cooled second zone under the temperature difference resulting from the warming and cooling of the zones whereby the resulting temperature difference is less than would exist absent such transfer of heat; discharging one component-containing purge gas from the second zone second end; and periodically switching the flows so that the gas mixture passes from the second to the first end of the second zone and the purge gas passes simultaneously from the second to the first end of the first zone.

5. A process for separating a gas mixture containing at least two selectively adsorbable components comprising the steps of providing at least two fixed adsorption zones in direct thermal association with each other coextensively in the longitudinal direction, a first zone first end being thermally associated with a second zone first end and a first zone second end being thermally associated with a second zone second end; passing said gas mixture at first high partial pressures to the two components through the first selective adsorption zone from the first to the second end thereby selectively adsorbing said two components, establishing at least two separate heat fronts and warming the zone by the heats of adsorption; discharging the two selected component-depleted effluent gas from the first zone second end; simultaneously passing a purge gas under second lower partial pressures of the two components through the thermally associated second adsorption zone from the second to the first end thereby desorbing the two previously adsorbed components and cooling the second zone by desorption; directly transferring the heats of adsorption received by the warmed first zone to a cooled second zone under the temperature difference resulting from the warming and cooling of the zones whereby the resulting temperature difference is less than would exist absent such transfer by heat; and periodically switching the flows so that the gas mixture passes through the purged second zone from the first end to the second end and the purge gas passes through the absorbed components-containing first zone from the second end to the first end.

6. A process according to claim 4 in which the gas mixture is helium-carbon dioxide and the selectively adsorbable component is carbon dioxide.

7. A process according to claim 4 in which the gas mixture is air and the selectively adsorbable component is nitrogen.

8. A process according to claim 4 in which the gas mixture is hydrogen-methane and the selectively adsorbable component is methane.

9. A process according to claim 4 in which the gas mixture is hydrogen-carbon dioxide and the selectively adsorbable component is carbon dioxide.

10. A process according to claim 5 in which the gas mixture comprises hydrogen, carbon dioxide, methane, carbon monoxide and nitrogen, and carbon dioxide, methane, carbon monoxide and nitrogen are the selectively adsorbable components.

11. A process according to claim 4 in which the selective adsorption zones contain activated carbon.

12. A process according to claim 4 in which the selective adsorption zones contain a crystalline zeolitic molecular sieve.

13. A process according to claim 4 in which the selective adsorption zones contain zeolite A.

14. A process according to claim 4 in which the selective adsorption zones contain zeolite X.

15. A process according to claim 4 in which the gas mixture is air, the selectively adsorbable component is nitrogen, and the selective adsorption zones contain zeolite A.

16. A process according to claim 4 in which the gas mixture is air, the selectively adsorbable component is oxygen, and the selective adsorption zones contain zeolite X.

17. In a pressure swing fixed bed adsorption process for separating a gas mixture containing at least one selectively adsorbable component by passing the gas mixture through a first selective fixed bed adsorption zone at a first high partial pressure of the one component for adsorption of said one component, and simultaneously passing a purge gas under a second lower partial pressure of said one component through a previously loaded second selective fixed bed adsorption zone having equal heat transfer capacity to the first zone for desorption of same, the improvement comprising providing said first and second selective adsorption zones in direct end-to-end thermal association with each other coextensively in the longitudinal direction to transfer the heat of adsorption received by the first selective adsorption zone during adsorption of said one component to the second selective adsorption zone during cooldown of the second zone from the desorption of said one component, thereby reducing the temperature difference between the two zones below that which would exist absent such transfer of heat.

18. Apparatus for separating a gas mixture containing at least one selectively adsorbable component comprising at least two selective adsorbent fixed beds each having a first end and a second end in the longitudinal direction; means for maintaining the beds in direct end-to-end coextensive thermal association in said longitudinal direction, the respective first and second ends being thermally associated with each other for heat transfer therebetween; means for introducing said gas mixture at a first high partial pressure of the one component to the first bed first end to establish only one heat front and means for discharging the one component-depleted effluent gas from the first bed second end; means for supplying and introducing purge gas to the second bed first end for removal of previously adsorbed one component under a second lower partial pressure of said one component and means for discharging the one component-containing purge gas from the second bed second end; means for switching the gas mixture flow from the first bed first end to the second bed second end and means for discharging the one component-depleted effluent gas from the second bed first end; means for switching the purge gas flow from the second bed first end to the first bed second end and means for discharging the one component-containing purge gas from the first bed first end; and means for switching the gas mixture flow back to the first bed first end and purge gas flow back to the second bed first end.

19. Apparatus for separating a gas mixture containing at least two selectively adsorbable components comprising at least two selective adsorbent fixed beds each having a first end and a second end in the longitudinal direction; means for maintaining the beds in direct end-to-end coextensive thermal association in said longitudinal direction, the respective first and second ends being thermally associated with each other for heat transfer therebetween; means for introducing said gas mixture at a first high partial pressure of the two components to the first bed first end to establish at least two separate heat fronts and means for discharging the two component-depleted effluent gas from the first bed second end; means for supplying and introducing purge gas to the second bed second end for removal of previously adsorbed two components under second lower partial pressures of the two components and means for discharging the two components-containing purge gas from the second bed first end; means for switching the gas mixture flow from the first bed first end to the second bed first end and means for discharging the two components-depleted effluent gas from the second bed second end; means for switching the purge gas flow from the second bed second end to the first bed second end for removal of previously adsorbed two components and means for discharging the two components-containing purge gas from the first bed first end; and means for switching the gas mixture flow back to the first bed first end and purge gas flow back to the second bed second end.

References Cited
UNITED STATES PATENTS

| | | | |
|---|---|---|---|
| 1,924,849 | 8/1933 | Fonda | 55—179 X |
| 2,541,694 | 2/1951 | Galson | 55—179 |
| 2,944,627 | 7/1960 | Skarstrom | 55—179 X |
| 3,176,444 | 4/1965 | Kiyonaga | 55—75 X |

REUBEN FRIEDMAN, *Primary Examiner.*